(12) United States Patent
Zhang et al.

(10) Patent No.: US 12,517,396 B2
(45) Date of Patent: Jan. 6, 2026

(54) BACKLIGHT MODULE, MANUFACTURING METHOD THEREOF, AND DISPLAY MODULE

(71) Applicants: Chongqing BOE Optoelectronics Technology Co., Ltd., Chongqing (CN); BOE TECHNOLOGY GROUP CO., LTD., Beijing (CN)

(72) Inventors: Jinhong Zhang, Beijing (CN); Yu Wang, Beijing (CN); Wencheng Luo, Beijing (CN); Qiong Yuan, Beijing (CN); Ying Zhou, Beijing (CN); Zhi Li, Beijing (CN); Wei Ran, Beijing (CN); Hening Zhang, Beijing (CN); Bowen Xiong, Beijing (CN); Wenqi Quan, Beijing (CN); Xin Cen, Beijing (CN); Ke Liao, Beijing (CN)

(73) Assignees: Chongqing BOE Optoelectronics Technology Co., Ltd., Chongqing (CN); BOE TECHNOLOGY GROUP CO., LTD., Beijing (CN)

( * ) Notice: Subject to any disclaimer, the term of this patent is extended or adjusted under 35 U.S.C. 154(b) by 3 days.

(21) Appl. No.: 18/693,505

(22) PCT Filed: Feb. 24, 2023

(86) PCT No.: PCT/CN2023/078071
§ 371 (c)(1),
(2) Date: Mar. 19, 2024

(87) PCT Pub. No.: WO2024/174214
PCT Pub. Date: Aug. 29, 2024

(65) Prior Publication Data
US 2025/0138366 A1    May 1, 2025

(51) Int. Cl.
*G02F 1/13357* (2006.01)
*G02F 1/1335* (2006.01)

(52) U.S. Cl.
CPC .. *G02F 1/133604* (2013.01); *G02F 1/133614* (2021.01); *G02F 1/133622* (2021.01)

(58) Field of Classification Search
CPC ................................................ G02F 1/133614
See application file for complete search history.

(56) References Cited

U.S. PATENT DOCUMENTS

| 11,333,924 | B1 * | 5/2022 | Lv ...................... G02F 1/133612 |
| 2009/0180055 | A1 * | 7/2009 | Kim .................. G02F 1/133603 |
| | | | 362/97.3 |

(Continued)

FOREIGN PATENT DOCUMENTS

| CN | 105676522 A | 6/2016 |
| CN | 106292057 A | 1/2017 |

(Continued)

*Primary Examiner* — Eric T Eide
(74) *Attorney, Agent, or Firm* — HOUTTEMAN LAW LLC

(57) ABSTRACT

A backlight module, including a back plate, and a colored light source plate, a first color conversion layer and a plurality of first optical processing layers, which are on the back plate and sequentially arranged away from the back plate; where the backlight module further comprises a second color conversion layer on at least a side, away from the back plate, of one of the plurality of first optical processing layers farthest from the back plate; an orthographic projection of the second color conversion layer on the first optical processing layer is in a peripheral edge region of the first optical processing layer; and the second color conversion layer is configured to convert monochromatic light emitted by the colored light source plate and incident into the second color conversion layer, into white light.

20 Claims, 12 Drawing Sheets

(56) References Cited

U.S. PATENT DOCUMENTS

| | | | | |
|---|---|---|---|---|
| 2015/0323728 A1* | 11/2015 | Lee | ................ | G02F 1/133509 |
| | | | | 362/97.1 |
| 2021/0033926 A1* | 2/2021 | Lim | ................ | G02F 1/133603 |
| 2021/0033930 A1* | 2/2021 | Lee | ................ | G02F 1/133603 |
| 2023/0097447 A1* | 3/2023 | Zhao | ................ | G02F 1/133614 |
| | | | | 362/97.1 |

FOREIGN PATENT DOCUMENTS

| | | |
|---|---|---|
| CN | 106483698 A | 3/2017 |
| CN | 106526963 A | 3/2017 |
| CN | 206020885 U | 3/2017 |
| CN | 109521604 A | 3/2019 |
| CN | 113970860 A | 1/2022 |
| CN | 215416191 U | 1/2022 |
| CN | 114072722 A | 2/2022 |
| CN | 114253032 A | 3/2022 |
| CN | 216210356 U | 4/2022 |
| CN | 216792630 U | 6/2022 |
| CN | 115356875 A | 11/2022 |

\* cited by examiner

BACKLIGHT MODULE, MANUFACTURING METHOD THEREOF, AND DISPLAY MODULE

TECHNICAL FIELD

Embodiments of the present disclosure relate to the field of display technology, and in particular, to a backlight module, a manufacturing method thereof, and a display module.

BACKGROUND

In the prior art, an NB (Note Book) Mini LED LCD (Liquid Crystal Display), that is, a liquid crystal display notebook, employs a blue Mini LED as a backlight source, and a blue light leakage phenomenon may occur at the peripheral bezel of the liquid crystal display notebook.

SUMMARY

In a first aspect, an embodiment of the present disclosure provides a backlight module, including a back plate, a colored light source plate, a first color conversion layer and a plurality of first optical processing layers,
wherein the colored light source plate, the first color conversion layer and the plurality of first optical processing layers are on the back plate and sequentially arranged away from the back plate;
the colored light source plate is configured to emit non-white monochromatic light;
the first color conversion layer is configured to convert the monochromatic light emitted by the colored light source plate and incident into the first color conversion layer, into white light;
the plurality of first optical processing layers are each configured to scatter light incident into the first optical processing layer;
the backlight module further includes a second color conversion layer on at least a side, away from the back plate, of one of the plurality of first optical processing layers farthest from the back plate;
an orthographic projection of the second color conversion layer on the first optical processing layer is in a peripheral edge region of the first optical processing layer; and
the second color conversion layer is configured to convert the monochromatic light emitted by the colored light source plate and incident into the second color conversion layer, into white light.

In some embodiments, the first optical processing layer further includes a middle display region;
a distribution density of the second color conversion layer is gradually reduced along any direction from the peripheral edge region to the middle display region of the first optical processing layer;
the peripheral edge region of the first optical processing layer includes a non-corner region and at least one corner region;
the non-corner region includes a non-display region and an edge display region; each of the at least one corner region includes a non-display region and an edge display region; the non-display regions of the non-corner region and the corner region are connected to each other; and the edge display regions of the non-corner region and the corner region are connected to each other; and the non-display regions surround the edge display region; and the edge display regions surround the middle display region.

In some embodiments, the distribution density of the second color conversion layer per area of square millimeter varies linearly from 100% to 3%, in any direction from the peripheral edge region to the middle display region of the first optical processing layer.

In some embodiments, the distribution density of the second color conversion layer per area of square millimeter varies, in a direction from any one of the at least one corner region to the middle display region of the first optical processing layer, as follows: 100%→any distribution density in a range of 20% to 30%→any distribution density in a range of 10% to 15%→any distribution density in a range of 6% to 8%→any distribution density in a range of 1% to 3%.

In some embodiments, ranges of widths, in the direction from any one of the at least one corner region to the middle display region of the first optical processing layer, of respective regions with different distribution densities in the second color conversion layer are as follows:
a width of a region with the distribution density of 100% is in a range of 0.8 mm to 1.0 mm;
a width of a region with any distribution density in the range of 20% to 30% is in a range of 4.5 mm to 5.5 mm;
a width of a region with any distribution density in the range of 10% to 15% is in a range of 5.0 mm to 6.0 mm;
a width of a region with any distribution density in the range of 6% to 8% is in a range of 4.0 mm to 5.0 mm; and
a width of a region with any distribution density in the range of 1% to 3% is in a range of 4.0 mm to 5.0 mm.

In some embodiments, the distribution density of the second color conversion layer per area of square millimeter varies, in a direction from the non-corner region to the middle display region of the first optical processing layer, as follows: 100%→any distribution density in a range of 10% to 15%→any distribution density in a range of 6% to 8%→any distribution density in a range of 1% to 3%.

In some embodiments, ranges of widths, in the direction from the non-corner region to the middle display region of the first optical processing layer, of respective regions with different distribution densities in the second color conversion layer are as follows:
a width of a region with the distribution density of 100% is in a range of 0.8 mm to 1.0 mm;
a width of a region with any distribution density in the range of 10% to 15% is in a range of 5.0 mm to 6.0 mm;
a width of a region with any distribution density in the range of 6% to 8% is in a range of 4.0 mm to 5.0 mm; and
a width of a region with any distribution density in the range of 1% to 3% is in a range of 4.0 mm to 5.0 mm.

In some embodiments, the corner region of the first optical processing layer is a corner region with a right angle; and
a shape of a region, within the corner region of the first optical processing layer, with any distribution density per area of square millimeter in the range of 20% to 30% in the second color conversion layer, is an isosceles right triangle.

In some embodiments, at least two of the plurality of first optical processing layers farther from the back plate are each provided with one second color conversion layer on a side of the first optical processing layer away from the back plate, and the at least two first optical processing layers and the second color conversion layers are sequentially and alternately stacked.

In some embodiments, an orthographic projection of a region of the second color conversion layer with the distribution density per area of square millimeter of 100% on the first optical processing layer, covers the non-display region.

In some embodiments, the second color conversion layer includes a first part and a second part,
- an orthographic projection of the first part on the first optical processing layer covers the non-display region;
- an orthographic projection of the second part on the first optical processing layer is in the edge display region; and
- the second part includes a plurality of sub-patterns arranged at intervals.

In some embodiments, a spacing between any two adjacent sub-patterns of the plurality of sub-patterns varies linearly from 0.25 mm to 0.7 mm, in any direction from the edge display region of the peripheral edge region to the middle display region of the first optical processing layer.

In some embodiments, a spacing between any two adjacent sub-patterns of the plurality of sub-patterns varies, in a direction from the edge display region within any one of the at least one corner region of the first optical processing layer to the middle display region, as follows: any spacing in a range of 0.20 mm to 0.28 mm→any spacing in a range of 0.30 mm to 0.38 mm→any spacing in a range of 0.5 mm to 0.7 mm→any spacing in a range of 0.8 mm to 0.9 mm.

In some embodiments, a spacing between any two adjacent sub-patterns of the plurality of sub-patterns varies, in a direction from the edge display region within the non-corner region of the first optical processing layer to the middle display region, as follows: any spacing in a range of 0.30 mm to 0.38 mm→any spacing in a range of 0.5 mm to 0.7 mm→any spacing in a range of 0.8 mm to 0.9 mm.

In some embodiments, a shape of each of the plurality of sub-patterns includes a circle having a radius in a range of 0.040 mm to 0.050 mm In some embodiments, orthographic projections of the colored light source plate, the first color conversion layer, the plurality of first optical processing layers and the second color conversion layer on the back plate overlap each other; and
- the colored light source plate includes an array of lamp beads; and a light emitting surface of each of the lamp beads is opposite to the first color conversion layer.

In some embodiments, in any edge region of the first optical processing layer, a distribution width, in the edge display region, of an orthographic projection of the second color conversion layer on the first optical processing layer is K; and
- K is a shortest distance from an intersection between a boundary light ray closest to the middle display region among light rays emitted by the lamp bead at the outermost side of the edge region and the first optical processing layer, to a boundary line between the edge display region and the non-display region, which is corresponding to the edge region.

In some embodiments, a distance from the lamp bead in an edge row of the array of lamp beads to a boundary line of the edge display region closest to the lamp bead in the edge row is in a range of 1 mm to 3 mm; and
- a distance from the lamp bead in an edge column of the array of lamp beads to a boundary line of the edge display region closest to the lamp bead in the edge column is in a range of 1 mm to 3 mm.

In some embodiments, the colored light source plate is configured to emit blue light with a wavelength of 450 nm to 460 nm; and
- the second color conversion layer includes yellow phosphor material with a wavelength in a range of 560 nm to 580 nm.

In some embodiments, the backlight module further includes a mold frame, where the mold frame is on the back plate and surrounds a peripheral edge of the back plate;
- the mold frame and the back plate form an accommodating space, the colored light source plate, the first color conversion layer, the plurality of first optical processing layers, and the second color conversion layer are in the accommodating space;
- the mold frame is opposite to and spaced apart from end faces of edges of the first color conversion layer, the plurality of first optical processing layers and the second color conversion layer; and
- the backlight module further includes a second optical processing layer between the colored light source plate and the first color conversion layer; and a light emitting surface of the colored light source plate is opposite to the second optical processing layer.

In some embodiments, the back plate includes a bottom wall and a side wall surrounding a peripheral edge of the bottom wall;
- the colored light source plate is located on the side wall at an edge of the bottom wall; the backlight module further includes a second optical processing layer between the first color conversion layer and the bottom wall of the back plate, and a light emitting surface of the colored light source plate is opposite to an end face of an edge of the second optical processing layer;
- the backlight module further includes a mold frame on the bottom wall of the back plate and surrounding edges of the bottom wall other than the edge where the colored light source plate is located;
- the mold frame and the bottom wall form an accommodating space, and the second optical processing layer, the first color conversion layer, the plurality of first optical processing layers and the second color conversion layer are in the accommodating space; and
- the mold frame is opposite to and spaced apart from end faces of edges of the second optical processing layer, the first color conversion layer, the plurality of first optical processing layers and the second color conversion layer.

In some embodiments, the mold frame includes a mixture of polycarbonate and yellow phosphor with a wavelength in a range of 560 nm to 580 nm.

In some embodiments, the backlight module further includes a prism layer, where the prism layer is on a side, away from the back plate, of one of the plurality of first optical processing layers farthest from the back plate;
- or, the prism layer is between two adjacent ones of the plurality of first optical processing layers;
- or, the prism layer is between the plurality of first optical processing layers and the first color conversion layer.

In a second aspect, an embodiment of the present disclosure provides a display module, including the backlight module described above; and
- a display panel on a light emitting side of the backlight module.

In a third aspect, an embodiment of the present disclosure provides a method of manufacturing a backlight module, including:

forming a second color conversion layer on at least a surface, away from a back plate, of one of a plurality of first optical processing layers farthest from the back plate, through spraying and printing with a mesh mask;

sequentially arranging a colored light source plate, a first color conversion layer and the plurality of first optical processing layers on the back plate;

wherein the second color conversion layer is on a side of the first optical processing layer away from the back plate; and an orthographic projection of the second color conversion layer on the first optical processing layer is in a peripheral edge region of the first optical processing layer.

BRIEF DESCRIPTION OF DRAWINGS

The accompanying drawings, which are included to provide a further understanding of the present disclosure and constitute a part of this specification, serve to explain the present disclosure together with the following detailed description, but do not constitute a limitation of the present disclosure. The above and other features and advantages will become more apparent to one of ordinary skill in the art by describing detailed examples with reference to the accompanying drawings, in which.

DETAIL DESCRIPTION OF EMBODIMENTS

Figure 1:
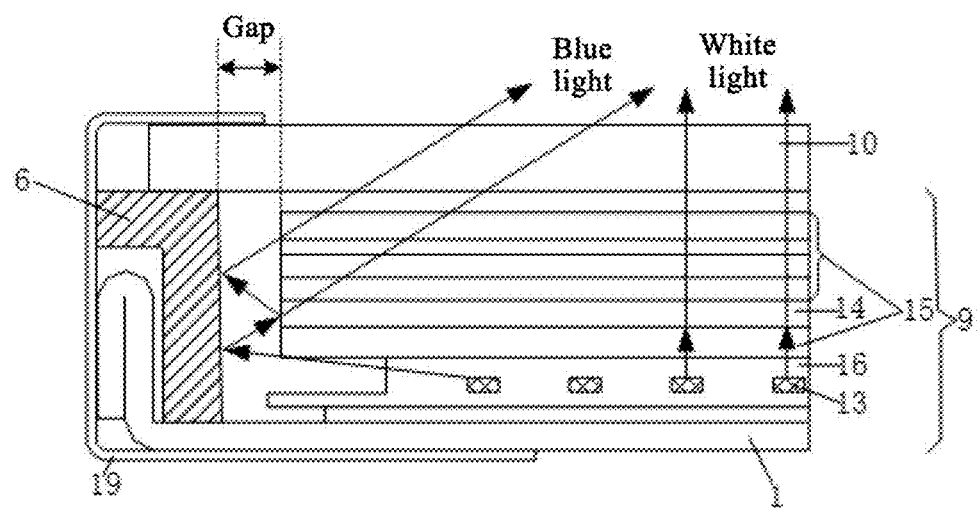
FIG. 1 is a cross-sectional view illustrating a structure of a part of a display module with a direct-lit backlight source.

In order to enable one of ordinary skill in the art to better understand the technical solutions of the embodiments of the present disclosure, a backlight module, a manufacturing method thereof, and a display module provided in the embodiments of the present disclosure are described in detail below with reference to the accompanying drawings and the detailed description.

The embodiments of the present disclosure will be described more fully hereinafter with reference to the accompanying drawings, and may be embodied in different forms and should not be construed as limited to the embodiments set forth herein. Rather, these embodiments are provided so that this disclosure will be thorough and complete, and will fully convey the scope of the present disclosure to one of ordinary skill in the art.

The embodiments of the present disclosure are not limited to the embodiments shown in the drawings, but include modifications of configurations formed based on a manufacturing process. Thus, the regions illustrated in the figures have schematic properties, and the shapes of the regions shown in the figures illustrate specific shapes of regions, but are not intended to be limiting.

In the related art, an NB Mini LED LCD, i.e., a liquid crystal display notebook, employs a direct-lit backlight source. FIG. 1 is a cross-sectional view illustrating a structure of a part of a display module with a direct-lit backlight source. Referring to FIG. 1, the display module includes a backlight module 9 and a display panel 10, where the display panel 10 is located on a light emitting side of the backlight module 9; and an edge tape 19 is provided to wrap end faces of peripheral edges of the backlight module 9 and the display panel 10. The backlight module 9 includes a back plate 1, a mold frame 6 surrounding a peripheral edge of the back plate 1, and a backlight source 13, a color conversion film 14 and an optical film 15 which are sequentially arranged on the back plate 1. The back plate 1 and the mold frame 6 surrounds an accommodating space in which the backlight source 13, the color conversion film 14 and the optical film 15 are accommodated. A backlight source 13 in the backlight module 9 employs a blue light Mini LED chip; and the blue light Mini LED chip is assembled on a lamp plate 16. The blue light Mini LED chip emits blue light. The blue light passes through the color conversion film 14 (such as a QD film, i.e., a quantum dot color conversion film), and is converted to white light. Then the light passes through the optical film 15, such as a homogenizer, a diffusor, a prism film, or the like, which are sequentially stacked together, and is uniformly scattered, and finally passes through the display panel 10 on the light emitting side of the backlight module 9 side, to accomplish the display.

Along with gradual reduction of a bezel of the liquid crystal display notebook, a distance from peripheral edges of the color conversion film 14 and the optical film 15 to a display region is reduced. Since a space is required to be reserved for assembly and expansion of the peripheral edges of the color conversion film 14 and the optical film 15 in the backlight module 9, a gap is formed between end faces of the peripheral edges of the color conversion film 14 and the optical film 15 and the mold frame 6. During display, a part of the blue light emitted by the blue light Mini LED chip is not converted into white light without passing through the color conversion film 14, or is insufficiently converted into white light when passing through the color conversion film 14, and leaks from the gap, so that color difference is formed by the blue light leaked from the peripheral edge of the display module and the white light converted from the blue light by the color conversion film 14 in the middle display region, blue light leakage at the peripheral edge of the display module is presented, and the problem of poor image quality occurs. The problem of the peripheral blue light leakage is more and more difficult to be solved, with the development of the small and medium sized backlight module 9 that the edge-lit LED light source is changed to the Mini LED light source, and the trend of the narrow bezel and zero bezel.

Figure 2A:
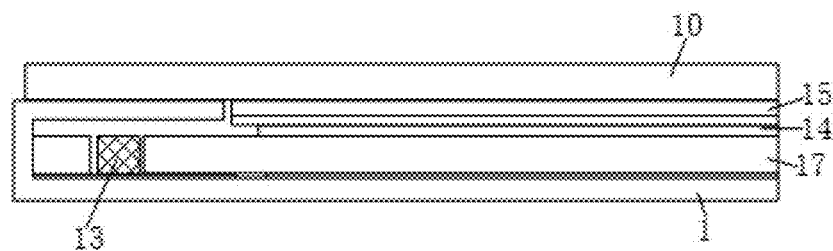
FIG. 2a is a cross-sectional view illustrating a structure of a part of a display module with an edge-lit backlight source at an edge where the backlight source exists.
Figure 2B:
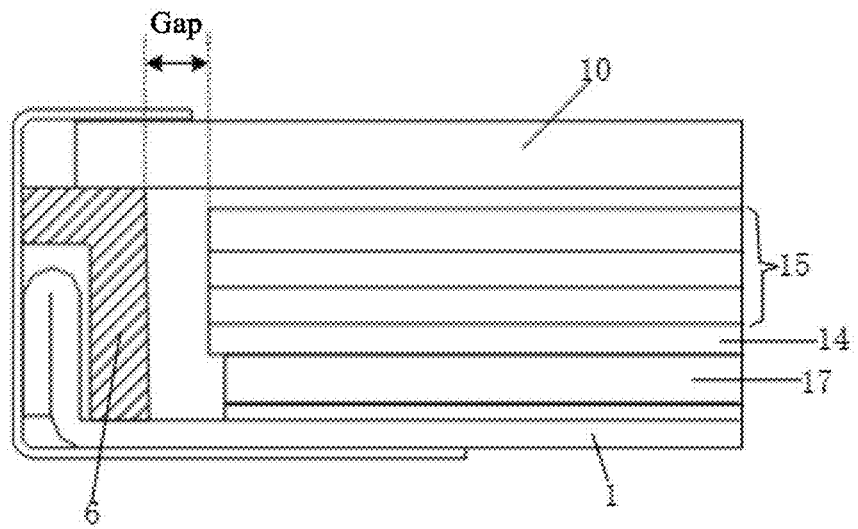
FIG. 2b is a cross-sectional view illustrating a structure of a part of a display module with an edge-lit backlight source at an edge where a mold frame exists.

In addition, the display module employing the edge-lit blue light Mini LED backlight source also has the problem of peripheral light leakage. FIG. 2a is a cross-sectional view illustrating a structure of a part of a display module with an edge-lit backlight source at an edge where the backlight source exists; FIG. 2b is a cross-sectional view illustrating a structure of a part of a display module with an edge-lit backlight source at an edge where a mold frame exists. The backlight source 13 is located at an edge of the back plate 1, and the mold frame 6 is arranged around the other edges of the back plate 1. An accommodating space is formed between the mold frame 6 and the back plate 1, and a light guide plate 17, the color conversion film 14 and the optical film 15 are sequentially arranged on the back plate 1 and accommodated in the accommodating space. A light emitting surface of the backlight source 13 faces an end face of an edge of the light guide plate 17. Since a space is required to reserve for the assembly and expansion of the peripheral edges of the color conversion film 14 and the optical film 15 in the backlight module 9, a gap is formed between end faces of edges of the color conversion film 14 and the optical film 15 and the mold frame 6. During display, a part of the blue light emitted by the blue light Mini LED chip is not converted into white light without passing through the color conversion film 14, or is insufficiently converted into white light when passing through the color conversion film 14, and leaks from the gap, so that color difference is formed by the blue light leaked from the gap at an edge of the display module and the white light converted from the blue light by the color conversion film 14 in the middle display region, blue light leakage at the peripheral edge of the display module is presented, and the problem of poor image quality occurs.

Figure 3:
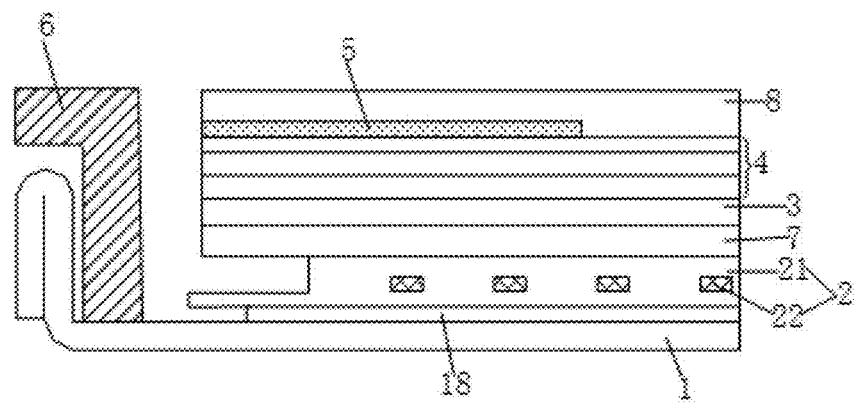
FIG. 3 is a cross-sectional view illustrating a structure of an edge of a backlight module in an embodiment of the present disclosure.

In order to solve the above problems in the prior art, in a first aspect, a backlight module is provided in an embodiment of the present disclosure. FIG. 3 is a cross-sectional view illustrating a structure of an edge of a backlight module in an embodiment of the present disclosure. Referring to FIG. 3, the backlight module includes a back plate 1, a colored light source plate 2, a first color conversion layer 3 and a plurality of first optical processing layers 4. The colored light source plate 2, the first color conversion layer 3 and the plurality of first optical processing layers 4 are located on the back plate 1 and are sequentially arranged away from the back plate 1. The colored light source plate 2 may emit non-white monochromatic light. The first color conversion layer 3 may convert the monochromatic light, emitted by the colored light source plate 2 and incident into the first color conversion layer 3, into white light. The first optical processing layers 4 may scatter the light incident into the first optical processing layers. The backlight module further includes a second color conversion layer 5, which is located on at least a side, away from the back plate 1, of one of the first optical processing layers 4 farthest from the back plate 1. An orthographic projection of the second color conversion layer 5 on the first optical processing layer 4 is distributed in a peripheral edge region of the first optical processing layer 4. The second color conversion layer 5 may convert monochromatic light, emitted by the colored light source plate 2 and incident into the second color conversion layer 5, into white light.

An ideal state, after the light incident into the first optical processing layers 4 is scattered by the first optical processing layers 4, is that the light incident into the first optical processing layer 4 is processed uniform. The light incident into the first optical processing layer 4 in an actual product is in the uniform ideal state or a near uniform state (under a condition that an ideal effect is not achieved).

Figure 4:
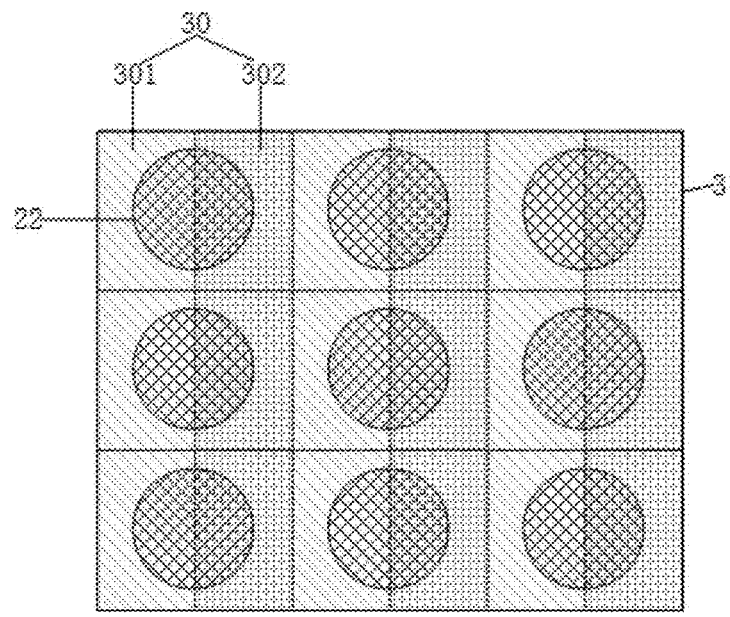
FIG. 4 is a schematic top view of a colored light source plate and a first color conversion layer stacked together in an embodiment of the present disclosure.

FIG. 4 is a schematic top view of a colored light source plate and a first color conversion layer stacked together in an embodiment of the present disclosure. In some embodiments, referring to FIGS. 3 and 4, the colored light source plate 2 includes a substrate 21 and a plurality of lamp beads 22, where the lamp beads 22 are uniformly distributed on the substrate 21 in an array, and the lamp beads 22 each employ a blue light Mini LED. The substrate 21 includes an insulating material layer and circuit traces arranged in the insulating material layer, and the circuit traces are connected to the lamp beads 22 to provide power for the lamp beads 22.

In some embodiments, the first color conversion layer 3 employs a quantum dot color conversion film, the quantum dot color conversion film includes a plurality of color conversion units 30, and the plurality of color conversion units 30 are uniformly arranged in an array. Each color conversion unit 30 includes a red quantum dot color film 301 and a green quantum dot color film 302, which are connected to each other.

In some embodiments, the colored light source panel 2 may emit blue light with a wavelength in a range of 450 nm to 460 nm. The second color conversion layer 5 employs yellow phosphor material with a wavelength in a range of 560 nm to 580 nm. The yellow phosphor material with the wavelength in a range of 560-580 nm emits yellow light, and the blue light and the yellow light are mixed and neutralized to become white light, so that the color conversion of the blue light is realized.

In some embodiments, the colored light source panel 2 may alternatively emit other colors of light, such as red or green light. Accordingly, the second color conversion layer 5 employs a material that can convert red or green light into white light by the principle of light mixing and neutralization.

In some embodiments, referring to FIG. 4, the plurality of color conversion units 30 are in one-to-one correspondence with the plurality of lamp beads 22. In some embodiments, one color conversion unit 30 may alternatively correspond to a plurality of lamp beads 22. In some embodiments, one lamp bead 22 may alternatively correspond to a plurality of color conversion units 30. The blue light emitted by the blue Mini LED is converted into white light after passing through the color conversion unit 30, and the white light serves as the backlight when the display module employing the backlight module displays.

In some embodiments, the plurality of first optical processing layers 4 are one or more homogenizers and one or more diffusors, which can uniformly scatter light. The plurality of first optical processing layers 4 do not include a prism layer, since the prism layer is difficult to be formed on the second color conversion layer.

In some embodiments, referring to FIG. 3, the backlight module further includes a mold frame 6 arranged on the back plate 1 and surrounding the peripheral edge of the back plate 1. The mold frame 6 and the back plate 1 form an accommodating space, and the colored light source plate 2, the first color conversion layer 3, the plurality of first optical processing layers 4 and the second color conversion layer 5 are accommodated in the accommodating space. Orthographic projections of the colored light source plate 2, the first color conversion layer 3, the plurality of first optical processing layers 4 and the second color conversion layer 5 on the back plate 1 overlap each other. That is, the colored light source plate 2 in this embodiment is a direct-lit light source. The mold frame 6 is opposite to and spaced apart from end faces of the edges of the first color conversion layer 3, the plurality of first optical processing layers 4 and the second color conversion layer 5. With this arrangement, a space can be reserved for assembly and expansion of the peripheral edges of the first color conversion layer 3, the plurality of first optical processing layers 4, and the second color conversion layer 5. A second optical processing layer 7 is arranged between the colored light source plate 2 and the first color conversion layer 3. The light emitting surface of the colored light source plate 2 faces the second optical processing layer 7.

In some embodiments, the second optical processing layer 7 employs a diffuser plate. The diffuser plate can uniformly scatter light, irradiating into the diffuser plate from the colored light source board 2, so that it is convenient for the uniform light to be converted into uniform white light after passing through the first color conversion layer 3, thereby it is beneficial to providing uniform backlight for the display panel.

In some embodiments, referring to FIG. 3, the backlight module further includes a prism layer 8 located on a side, away from the back plate 1, of one of the first optical processing layers 4 farthest from the back plate 1. The prism layer 8 can uniformly scatter the light incident into the prism layer, so that the backlight module can provide more uniform backlight. Since the second color conversion layer is difficult to be formed on the prism layer 8, the second color conversion layer is not provided on the prism layer 8.

In some embodiments, the prism layer may alternatively be located between adjacent first optical processing layers. In some embodiments, the prism layer may alternatively be located between the first optical processing layer and the first color conversion layer.

In some embodiments, referring to FIG. 3, the backlight module further includes a reflective layer 18 located between the back plate 1 and the colored light source plate 2, for reflecting the light, irradiating on the reflective layer 18 from the colored light source plate 2, to the light emitting side of the backlight module.

Figure 5:
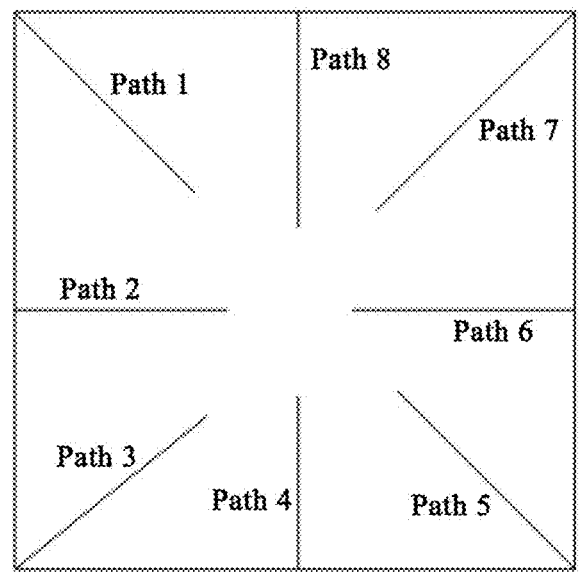
FIG. 5 is a schematic diagram illustrating a path of sampling points for testing blue light leakage intensity of a backlight module in a peripheral edge region.
Figure 6:
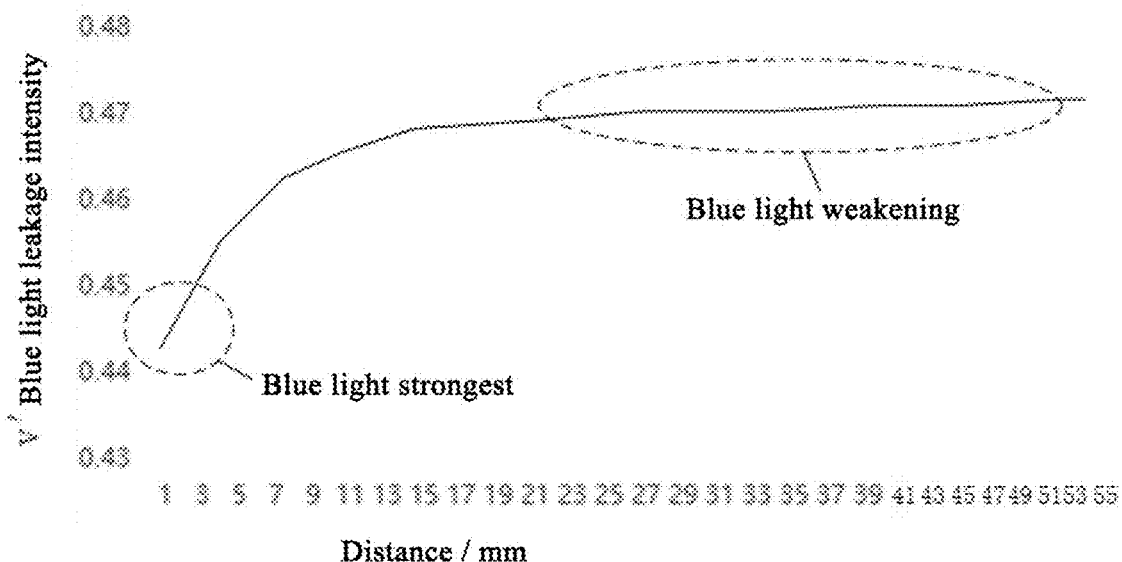
FIG. 6 is a curve illustrating variation of blue light leakage intensity of a backlight module prior to improvement at a peripheral edge region, along any one of the paths of sampling points in FIG. 5.
Figure 7:
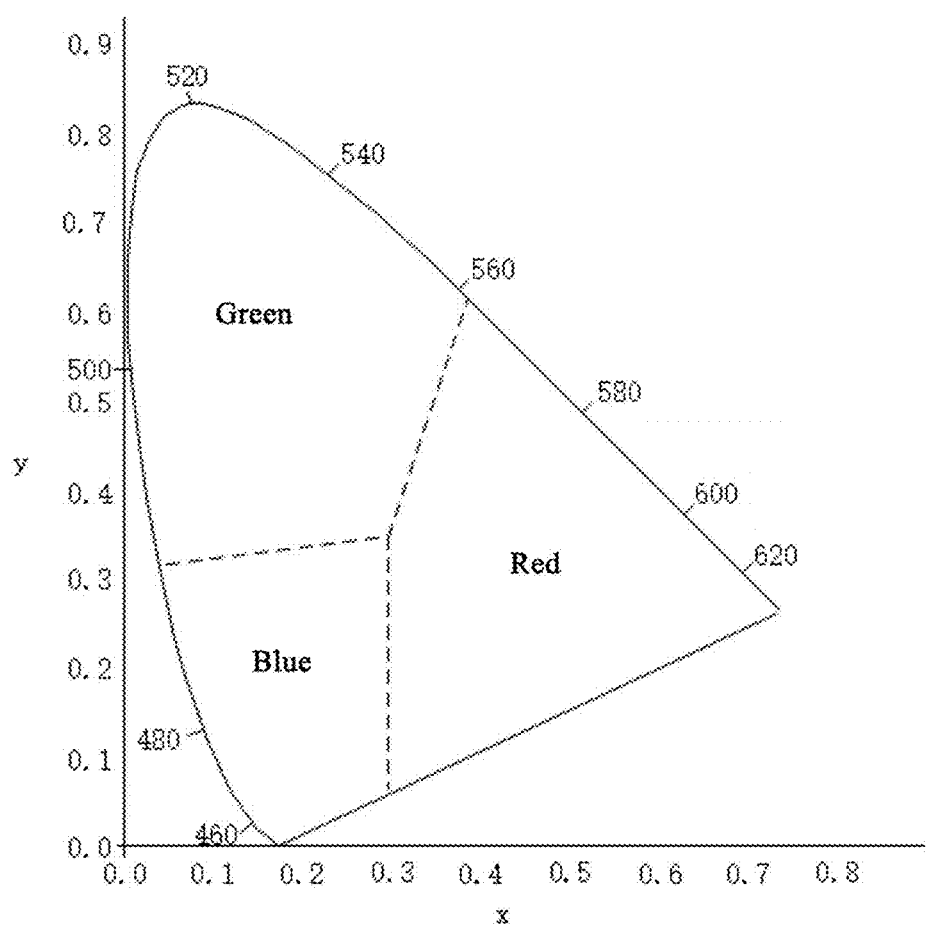
FIG. 7 is a CIE1931 chromaticity diagram.
Figure 8:
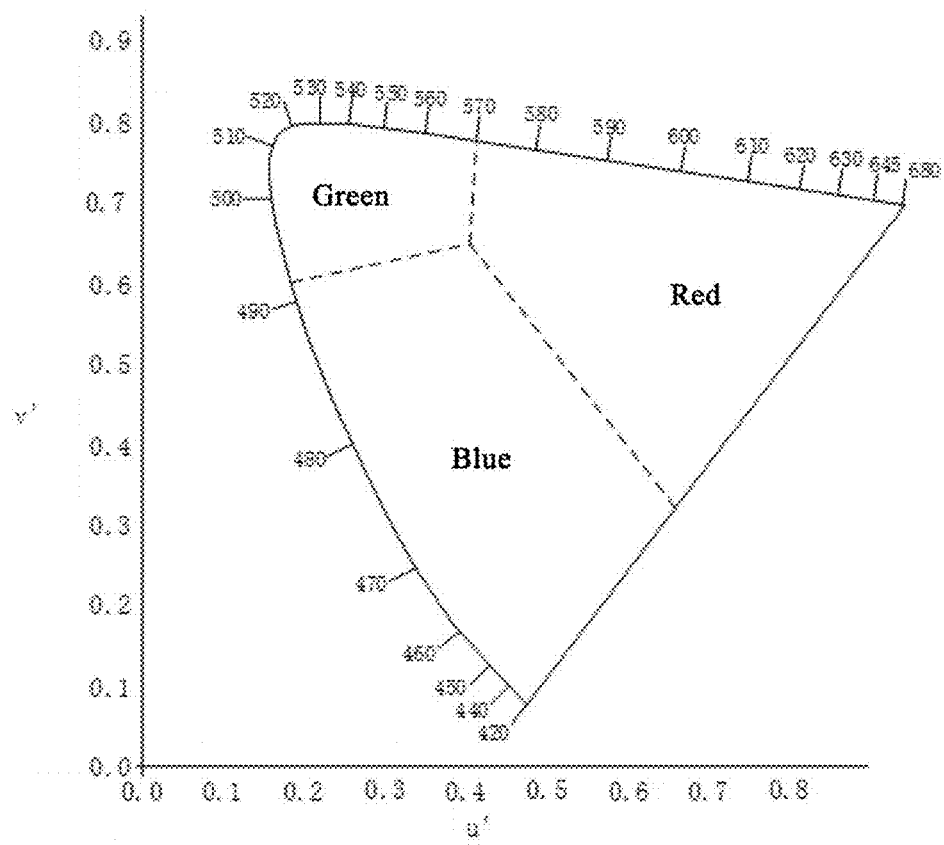
FIG. 8 is a CIE1976 chromaticity diagram.

FIG. 5 is a schematic diagram illustrating a path of sampling points for testing blue light leakage intensity of a backlight module at a peripheral edge region; and FIG. 6 is a curve illustrating variation of blue light leakage intensity of a backlight module prior to improvement at a peripheral edge region, along any one of the paths of sampling points in FIG. 5. In some embodiments, referring to FIGS. 5 and 6, the backlight module includes a middle region, and blue light leakage strength test is performed along any one of the paths of sampling points from the peripheral edge region to the middle region of the backlight module in FIG. 5. FIG. 7 is a CIE1931 chromaticity diagram. For example, referring to FIGS. 5 and 7, where white coordinates (Wx, Wy) of positions at centers of four edges of the backlight module and positions at corners of the backlight module are measured from the edge region to the middle region along eight paths of sampling points for testing blue light leakage intensity, respectively, with a high-precision optical test, where Wx and Wy refer to chromatic coordinates of a horizontal axis and a vertical axis in a CIE1931 chromaticity space, respectively. The horizontal axis x and the vertical axis y of the CIE1931 chromaticity diagram represent a distribution of intensities of the red, green, and blue light, respectively. White coordinate data is measured every 0.1 mm of movement along any one of the paths of sampling points in FIG. 5. FIG. 8 is a CIE1976 chromaticity diagram. Referring to FIG. 8, in the CIE1976 chromaticity diagram, the chromatic coordinate parameters are (u', v'), where u', v' refer to the horizontal axis and vertical axis indexes in the CIE1976 chromaticity space, respectively, the horizontal axis coordinate u' represents a distribution of red and green light intensity, the vertical axis coordinate v' represents a distribution of blue light intensity. The vertical axis coordinate v' is highly correlated with yellow/blue chromaticity, so that the problem of blue light leakage intensity in the peripheral edge region of the backlight module can be simplified to the problem of single variable of v'. The larger the v' value is, the yellower the chromaticity is; and the smaller the v' value is, the bluer the chromaticity is. The white coordinates of the blue light leakage intensities measured on the eight paths of sampling points may be converted into v' values in the CIE1976 chromaticity space. Due to the particularity of the CIE1976 chromaticity, the blue light leakage intensity of the backlight module in the peripheral edge region can be measured by v'. The specific process of chromatic coordinate conversion is as follows: calculating the v' value through formula $$v' = \frac{9*Wy}{(-2)*Wx + 12*Wy + 3},$$

according to the white coordinates (Wx, Wy) of each test point on each path, thereby obtaining a curve of a relation between a distance and the v' value, where the distance is a distance from the test point to a starting point of any one of test paths along the path; the starting point of any one of the test paths is an end point of a test path corresponding to a peripheral edge line of the backlight module, and the curve of relation between the distance and the v' value represents variation of blue light leakage intensity with different distance along any one test path.

The results of testing the blue light leakage intensity of the backlight module in the peripheral edge region along any one of the paths of sampling points in FIG. 5 are shown in FIG. 6. The closer the sampling point is to the peripheral edge region, the stronger the blue light leakage intensity is, and the more serious the blueing phenomenon is; the closer the sampling point is to the middle region, the weaker the blue light leakage intensity is; the blueing phenomenon gradually weakens. The reasons are as follows: according to the light emitting characteristic of the blue light Mini LED, a space for assembly and expansion of the peripheral edges of the first color conversion layer and the first optical processing layers is required to be reserved, therefore the end faces of the peripheral edges of the first color conversion layer and the first optical processing layers are spaced apart from the mold frame, this results in that blue light emitted by the colored light source plate irradiates on the mold frame at the peripheral edge, then is reflected by the mold frame and is directly incident into the first optical processing layers without being converted by the first color conversion layer, so that the color conversion of the blue light is insufficient; the backlight module appears as a whole that blueing occurs in the peripheral edge region rather than the middle region. In the design of the second color conversion layer, a distribution density of the second color conversion layer in the peripheral edge region of the first optical processing layer and distribution widths under different distribution densities are required to be determined, according to the curve of variation of the blue light leakage intensity of the backlight module in the peripheral edge region.

Figure 9A:
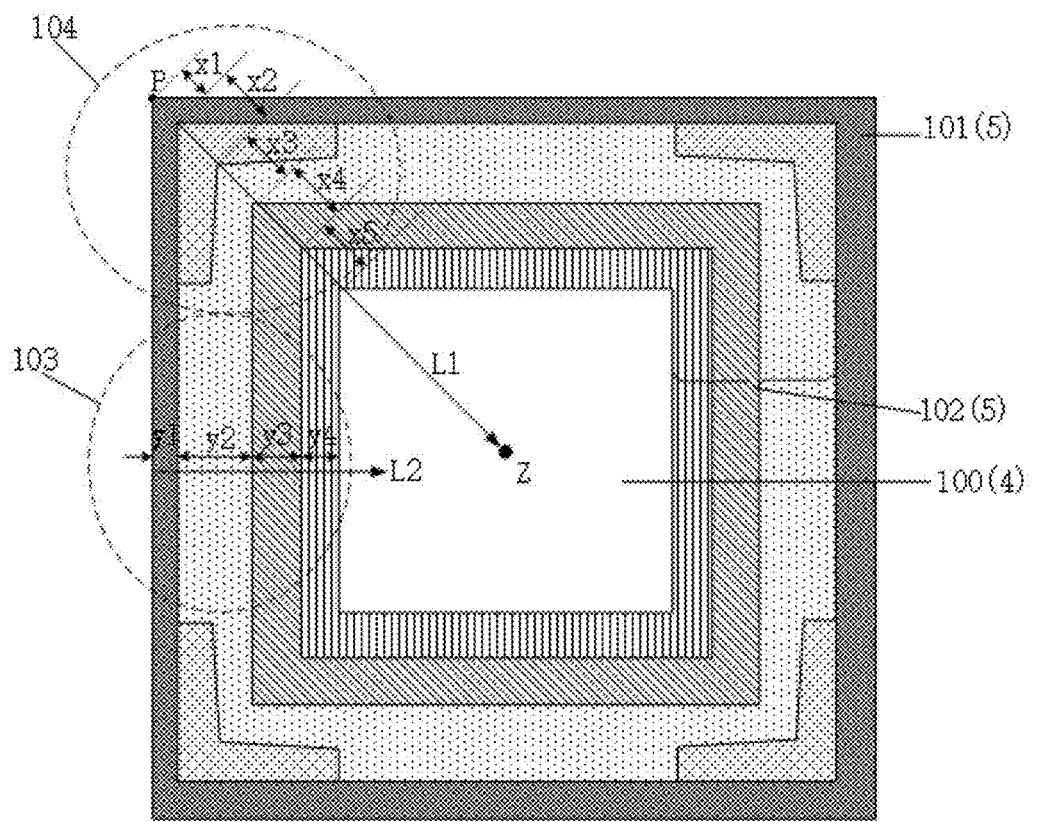
FIG. 9a is a schematic top view illustrating a distribution of a second color conversion layer on a first optical processing layer in an embodiment of the present disclosure.
Figure 9B:
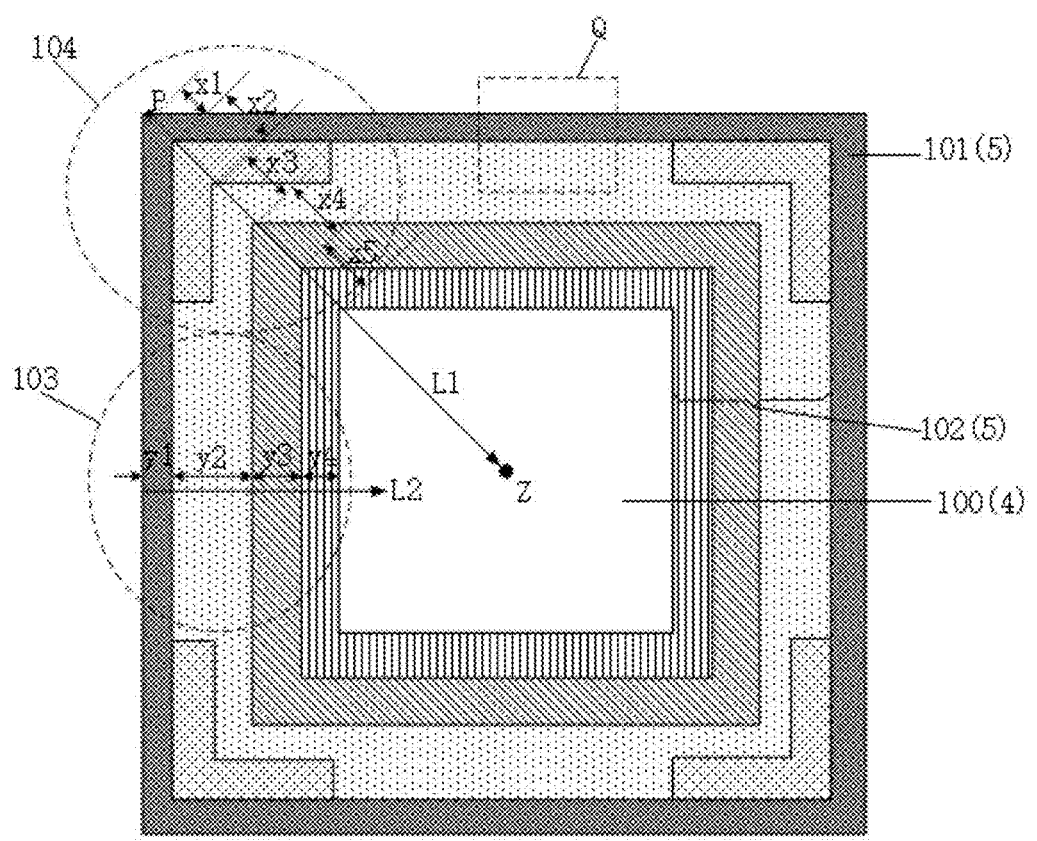
FIG. 9b is a schematic top view illustrating another distribution of a second color conversion layer on a first optical processing layer in an embodiment of the present disclosure.

FIG. 9a is a schematic top view illustrating a distribution of a second color conversion layer on a first optical processing layer in an embodiment of the present disclosure; and FIG. 9b is a schematic top view illustrating another distribution of a second color conversion layer on a first optical processing layer in an embodiment of the present disclosure. In some embodiments, referring to FIGS. 9a and 9b, the first optical processing layer 4 further includes an middle display region 100. The distribution density of the second color conversion layer 5 is gradually reduced along any direction from the peripheral edge region to the middle display region 100 of the first optical processing layer 4. The peripheral edge region of the first optical processing layer 4 includes a non-corner region 103 and at least one corner region 104. The non-corner region 103 includes a non-display region 101 and an edge display region 102, and the corner region 104 includes a non-display region 101 and an edge display region 102. The non-display regions 101 of the non-corner region 103 and the corner region 104 are connected to each other. The edge display regions 102 of the non-corner region 103 and the corner region 104 are connected to each other. The non-display regions 101 surround the edge display regions 102. The edge display regions 102 surround the middle display region 100.

In some embodiments, referring to FIGS. 9a and 9b, in a direction L1 from any corner region 104 to the middle display region 100 of first optical processing layer 4, the distribution density of the second color conversion layer 5 per area of square millimeter varies as follows: 100%→any distribution density in a range of 20% to 30%→any distribution density in a range of 10% to 15%→any distribution density in a range of 6% to 8%→any distribution density in a range of 1% to 3%.

In some embodiments, referring to FIGS. 9a and 9b, in the direction L1 from any corner region 104 to the middle display region 100 of the first optical processing layer 4, ranges of widths of the respective regions with different distribution densities in the second color conversion layer 5 are as follows: a width x1 of a region with a distribution density of 100% is in a range of 0.8 mm to 1.0 mm; a width x2 of a region with any distribution density in the range of 20% to 30% is in a range of 4.5 mm to 5.5 mm; a width x3 of a region with any distribution density in the range of 10% to 15% is in a range of 5.0 mm to 6.0 mm; a width x4 of a region with any distribution density in the range of 6% to 8% is in a range of 4.0 mm to 5.0 mm; and a width x5 of a region with any distribution density in the range of 1% to 3% is in a range of 4.0 mm to 5.0 mm.

Any corner region 104 of the first optical processing layer 4 includes a part of the non-display region 101 and a part of the edge display region 102. The direction L1 from any corner region 104 to the middle display region 100 of the first optical processing layer 4, refers to a direction from any point P on a boundary of the non-display region 101 within the corner region 104 of the first optical processing layer 4 away from the middle display region 100 to a center Z of the middle display region 100.

In some embodiments, any corner region 104 of the first optical processing layer 4 is a corner region with a right angle.

In some embodiments, referring to FIG. 9a, a width, in a direction from a vertex of a right angle of the corner region with the right angle of the first optical processing layer 4 to the center Z of the middle display region 100, of the region with any distribution density in the range of 20% to 30% is greater than a width, in a direction from any other point on the boundary of the non-display region 101 within the corner region with the right angle away from the middle display region 100 to the center Z of the middle display region 100, of the region with any distribution density in the range of 20% to 30%.

In some embodiments, referring to FIG. 9b, the width, in the direction from the vertex of the right angle of the corner region with the right angle of the first optical processing layer 4 to the center Z of the middle display region 100, of the region with any distribution density in the range of 20% to 30% is equal to the width, in the direction from any other point on the boundary of the non-display region 101 within the corner region with the right angle away from the middle display region 100 to the center Z of the middle display region 100, of the region with any distribution density in the range of 20% to 30%.

In some embodiments, referring to FIGS. 9a and 9b, in a direction L2 from any non-corner region 103 of first optical processing layer 4 to middle display region 100, the distribution density of second color conversion layer 5 per area of square millimeter varies as follows: 100%→any distribution density in a range of 10% to 15%→any distribution density in a range of 6% to 8%→any distribution density in a range of 1% to 3%.

In some embodiments, in the direction L2 from any non-corner region 103 to the middle display region 100 of the first optical processing layer 4, ranges of widths of the respective regions with different distribution densities in the second color conversion layer 5 are as follows: a width y1 of a region with a distribution density of 100% is in a range of 0.8 mm to 1.0 mm; a width y2 of a region with any distribution density in the range of 10% to 15% is in a range of 5.0 mm to 6.0 mm; a width y3 of a region with any distribution density in the range of 6% to 8% is in a range of 4.0 mm to 5.0 mm; and a width y4 of a region with any distribution density in the range of 1% to 3% is in a range of 4.0 mm to 5.0 mm.

Any non-corner region 103 of the first optical processing layer 4 includes a part of the non-display region 101 and a part of the edge display region 102. In a case where the boundary line of any non-corner region 103 of the first optical processing layer 4 away from the middle display region 100 is a straight line, the direction L2 from any non-corner region 103 to the middle display region 100 of the first optical processing layer 4, refers to a direction along which the non-display region 101, the edge display region 102 and the middle display region 100 are arranged within the non-corner region 103. In a case where the boundary line of any non-corner region of the first optical processing layer away from the middle display region is an arc line, the direction from any non-corner region to the middle display region of the first optical processing layer, refers to a direction from any point on a boundary line of the non-display region within the non-corner region of the first optical processing layer away from the middle display region to the center of the middle display region.

In some embodiments, in the direction from any non-corner region to the middle display region of the first optical processing layer, a region with a distribution density of 100% has a same width; a region with any distribution density in the range of 10% to 15% has a same width; a region with any distribution density in the range of 6% to 8% has a same width; and a region with any distribution density in the range of 1% to 3% has a same width.

Figure 9C:
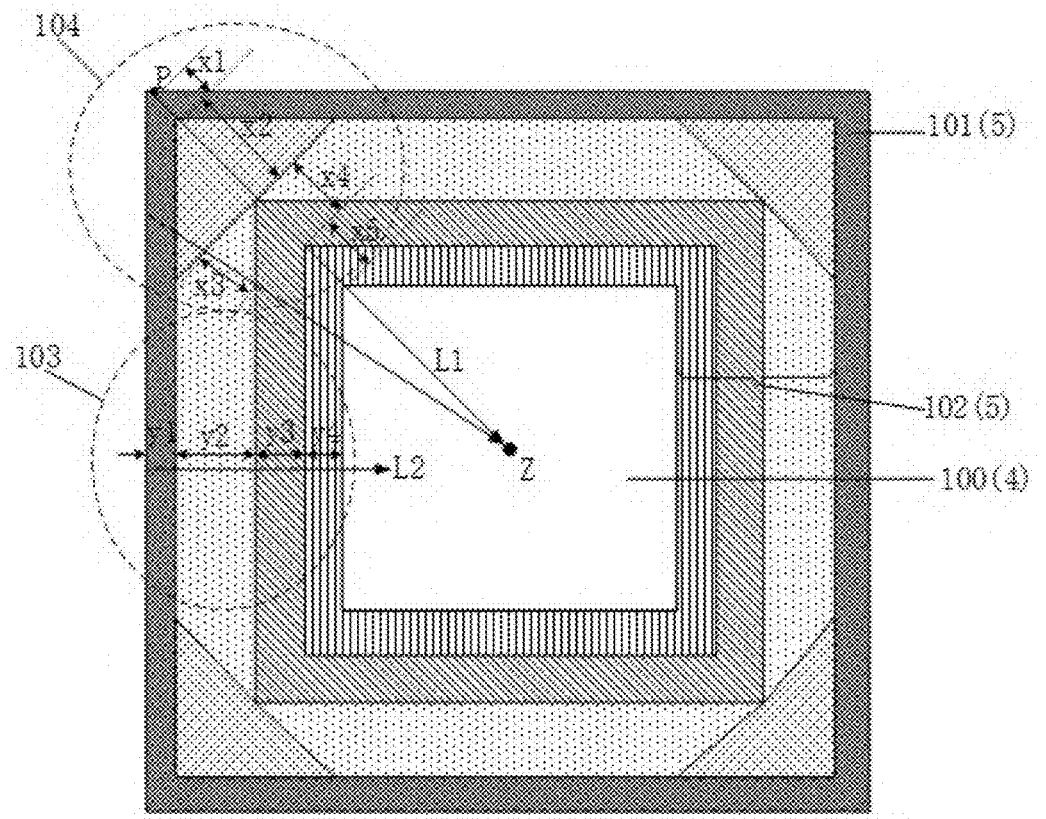
FIG. 9c is a schematic top view illustrating another distribution of a second color conversion layer on a first optical processing layer in an embodiment of the present disclosure.

FIG. 9c is a schematic top view illustrating another distribution of a second color conversion layer on a first optical processing layer in an embodiment of the present disclosure. In some embodiments, referring to FIG. 9c, the corner regions 104 of the first optical processing layer 4 each are a corner region with a right angle. A shape of the second color conversion layer 5 in a region with any distribution density per area of square millimeter in the range of 20% to 30% within the corner region 104 of the first optical processing layer 4 is an isosceles right triangle. The isosceles right triangle distribution of the second color conversion layer 5 in the region with any distribution density per area of square millimeter in the range of 20% to 30% within the corner region 104 of the first optical processing layer 4, can better prevent light leakage at the gap in the corner region 104 of the first optical processing layer 4.

In some embodiments, referring to FIG. 9c, the direction L1 from the corner region 104 to the middle display region 100 of the first optical processing layer 4, refers to a direction from any point P on a boundary of the non-display region 101 within the corner region with the right angle of the first optical processing layer 4 away from the middle display region 100 to the center Z of the middle display region 100.

In some embodiments, referring to FIG. 9c, a width x2 of the second color conversion layer 5, in a direction from a vertex of a right angle of the corner region with the right angle of the first optical processing layer 4 to the center Z of the middle display region 100, in the region with any distribution density in the range of 20% to 30% is in a range of 4.5 mm to 5.5 mm, and a width x2 of the second color conversion layer 5, in a direction from any other point on the boundary of the non-display region 101 within the corner region with the right angle of the first optical processing layer 4 away from the middle display region 100 to the center Z of the middle display region 100, in the region with any distribution density in the range of 20% to 30% is less than 4.5 mm.

In some embodiments, referring to FIG. 9c, a width of the second color conversion layer 5, in the direction from the vertex of the right angle of the corner region with the right angle of the first optical processing layer 4 to the center Z of the middle display region 100, in a region with any distribution density in the range of 10% to 15% is 0 mm, and a width x3 of the second color conversion layer 5, in a direction from any other point on the boundary of the non-display region 101 within the corner region with the right angle of the first optical processing layer 4 away from the middle display region 100 to the center Z of the middle display region 100, in a region with any distribution density in the range of 10% to 15% is in a range of 3.0 mm to 5.0 mm.

In some embodiments, referring to FIG. 9c, in a direction L1 from the corner region with the right angle of the first optical processing layer 4 to the middle display region 100, a width x1 of the region with the distribution density of 100%, a width x4 of the region with any distribution density in the range of 6% to 8%, and a width x5 of the region with any distribution density in the range of 1% to 3% are the same as the widths of the corresponding regions in FIGS. 9a and 9b, respectively.

In some embodiments, referring to FIG. 9c, in a direction L2 from any non-corner region 103 to middle display region 100 of first optical processing layer 4, the distribution densities of second color conversion layer 5 per area of square millimeter and the ranges of widths of the regions with different distribution densities are the same as those in the schemes of FIGS. 9a and 9b, respectively.

In some embodiments, the distribution density of the second color conversion layer per area of square millimeter linearly varies from 100% to 3%, in any direction from the peripheral edge region to the middle display region of the first optical processing layer.

Figure 10:
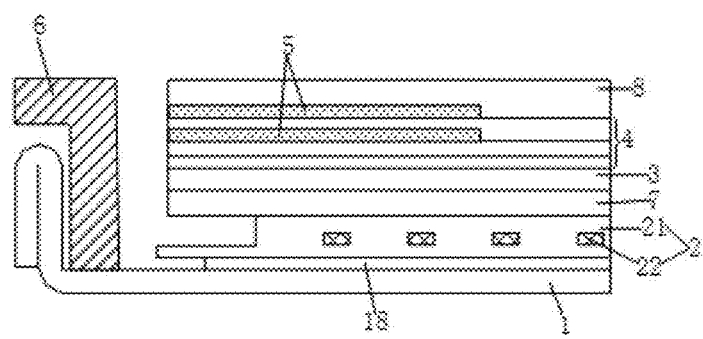
FIG. 10 is a cross-sectional view illustrating another structure of an edge of a backlight module in an embodiment of the present disclosure.

FIG. 10 is a cross-sectional view illustrating another structure of an edge of the backlight module in an embodiment of the present disclosure. In some embodiments, referring to FIG. 10, on a side, away from the back plate 1, of each of at least two first optical processing layers 4 farther from the back plate 1 in the plurality of first optical processing layers 4, one second color conversion layer 5 is arranged. The at least two first optical processing layers 4 and the respective second color conversion layers 5 are sequentially and alternately stacked.

Figure 11:
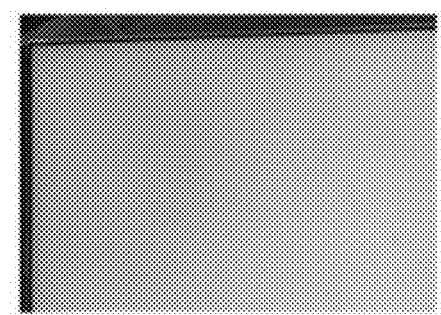
FIG. 11 is a diagram illustrating an actual assembly effect of the backlight module employing a scheme in which at least two first optical processing layers are each provided with one second color conversion layer on a side thereof away from the back plate.

It is determined, according to the actual assembly of the first optical processing layer 4 on which the second color conversion layer 5 is arranged, that the actual non-white monochromatic light leakage at the peripheral edge regions of the plurality of first optical processing layers 4 is required to be adjusted according to the actual assembly effect of the plurality of first optical processing layers 4 and the image quality, due to assembly tolerance, incoming material tolerance (±0.4 mm) and other factors of the first optical processing layer 4 on which the second color conversion layer 5 is arranged. Generally, the second color conversion layer 5 is located on a side of the first optical processing layer 4 farthest from the back plate 1 away from the back plate 1. However, if the image quality still cannot be met after light leakage is adjusted for many times, the scheme of respectively arranging one second color conversion layer 5 on the side, away from the back plate 1, of each of at least two first optical processing layers 4 farther from the back plate 1 is employed. In this scheme, the distribution densities and the distribution widths of the second color conversion layers 5 on the side of the respective first optical processing layers 4 away from the back plate 1 are the same as each other. FIG. 11 is a diagram illustrating an actual assembly effect of the backlight module employing a scheme in which at least two first optical processing layers are each provided with one second color conversion layer on a side thereof away from the back plate. Referring to FIG. 11, the phenomenon of blue light leakage at the edge of the backlight module is obviously improved.

In some embodiments, referring to FIGS. 9a, 9b, and 9c, an orthographic projection of the second color conversion layer 5 with a distribution density per area of square millimeter of 100% on the first optical processing layer 4 covers the non-display region 101.

Figure 12:
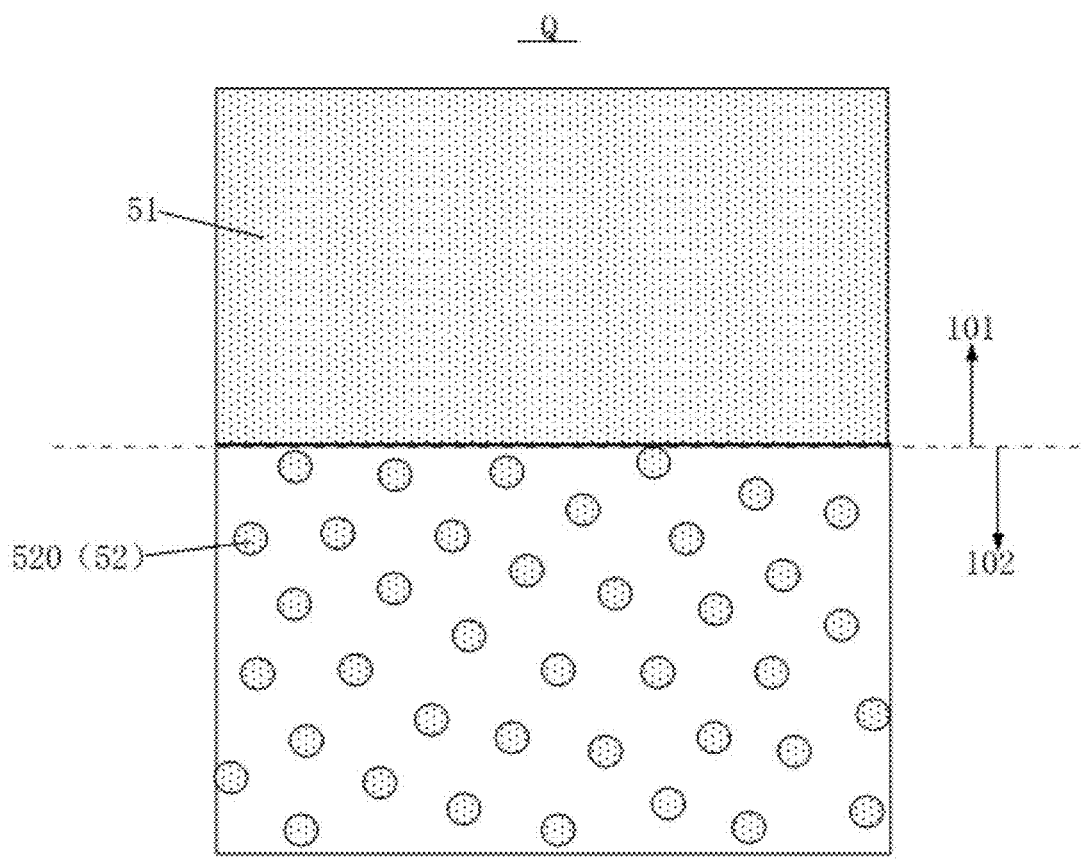
FIG. 12 is a schematic enlarged view of a part Q in FIG. 9b.

FIG. 12 is a schematic enlarged view of a part Q in FIG. 9b. In some embodiments, referring to FIG. 12, the second color conversion layer 5 includes a first part 51 and a second part 52, where an orthographic projection of the first part 51 on the first optical processing layer 4 covers the non-display region 101; an orthographic projection of the second part 52 on the first optical processing layer 4 is in the edge display region 102; and the second part 52 includes a plurality of sub-patterns 520, and the sub-patterns 520 are arranged at intervals.

In some embodiments, referring to FIG. 12, in a direction from the edge display region 102 within any corner region 104 of the first optical processing layer 4 to the middle display region 100, a spacing between any two adjacent sub-patterns 520 varies as follows: any spacing in a range of 0.20 mm to 0.28 mm→any spacing in a range of 0.30 mm to 0.38 mm→any spacing in a range of 0.5 mm to 0.7 mm→any spacing in a range of 0.8 mm to 0.9 mm. Therefore, an effect of variation of the distribution density of the second color conversion layer 5 per area of square millimeter, in the direction from the edge display region 102 within any corner region 104 of first optical processing layer 4 to the middle display region 100, as shown in FIGS. 9a and 9b is realized, which varies as follows: any distribution density in a range of 20% to 30%→any distribution density in a range of 10% to 15%→any distribution density in a range of 6% to 8%→any distribution density in a range of 1% to 3%.

The direction from the edge display region 102 within any corner region 104 of the first optical processing layer 4 to the middle display region 100, refers to the direction from any corner region 104 of the first optical processing layer 4 to the middle display region 100, that is, the direction from any point on the boundary of the non-display region 101 within the corner region 104 of the first optical processing layer 4 away from the middle display region 100 to the center of the middle display region 100.

In some embodiments, referring to FIG. 12, in the direction from the edge display region 102 within any corner region 104 of the first optical processing layer 4 to the middle display region 100, the spacing between any two adjacent sub-patterns 520 varies as follows: 0.25 mm→0.37 mm→0.7 mm→0.9 mm.

In some embodiments, referring to FIG. 12, in a direction from the edge display region 102 within any non-corner region 103 of the first optical processing layer 4 to the middle display region 100, a spacing between any two adjacent sub-patterns 520 varies as follows: any spacing in a range of 0.30 mm to 0.38 mm→any spacing in a range of 0.5 mm to 0.7 mm→any spacing in a range of 0.8 mm to 0.9 mm. Therefore, an effect of variation of the distribution density of the second color conversion layer 5 per area of square millimeter, in the direction from the edge display region 102 within any non-corner region 103 of the first optical processing layer 4 to the middle display region 100, as shown FIGS. 9a and 9b is realized, which varies as follows: any distribution density in a range of 10% to 15%→any distribution density in a range of 6% to 8%→any distribution density in a range of 1% to 3%.

The direction from the edge display region 102 within any non-corner region 103 of the first optical processing layer 4 to the middle display region 100, refers to the direction from any non-corner region 103 of the first optical processing layer 4 to the middle display region 100.

In some embodiments, referring to FIG. 12, in the direction from the edge display region 102 within any non-corner region 103 of the first optical processing layer 4 to the middle display region 100, the spacing between any two adjacent sub-patterns 520 varies as follows: 0.37 mm→0.7 mm→0.9 mm.

In some embodiments, in any direction from the edge display region in the peripheral edge region to the middle display region of the first optical processing layer, the spacing between any two adjacent sub-patterns linearly varies from 0.25 mm to 0.7 mm. Therefore, an effect of variation of the distribution density, from 100% to 3%, of the second color conversion layer per area of square millimeter, in any direction from the peripheral edge region to the middle display region of the first optical processing layer, is realized.

In some embodiments, a shape of the sub-pattern 520 includes a circle having a radius in a range of 0.040 mm to 0.050 mm.

In some embodiments, referring to FIGS. 3 and 4, the colored light source panel 2 includes an array of lamp beads 22; and the light emitting surface of the lamp beads 22 faces the first color conversion layer 3.

Figure 13:
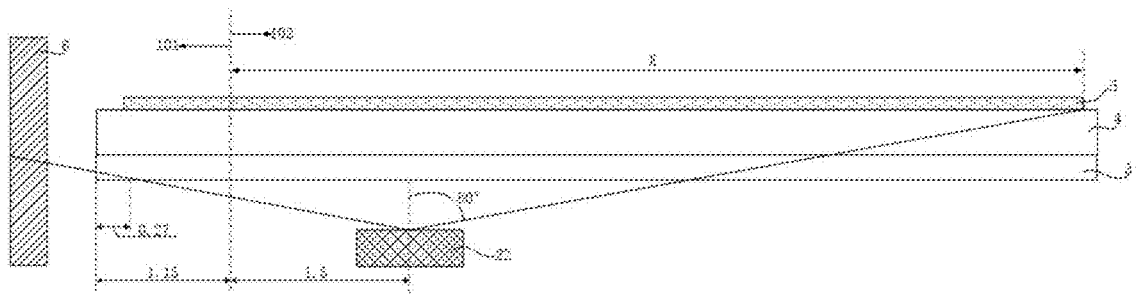
FIG. 13 is a schematic diagram illustrating a distribution width of a second color conversion layer (a width of a distribution of the second color conversion layer, that is, a width of a region where the second color conversion layer is distributed) in any edge region of a first optical processing layer.

FIG. 13 is a schematic diagram illustrating a distribution width of a second color conversion layer in any edge region of a first optical processing layer. In some embodiments, referring to FIG. 13, in any edge region of the first optical processing layer 4, a distribution width, in the edge display region 102, of an orthographic projection of the second color conversion layer 5 on the first optical processing layer 4 is K; K is a shortest distance from an intersection between a boundary light ray closest to the middle display region 100 among light rays emitted by the lamp bead 22 located at the outermost side of the edge region and the first optical processing layer 4, to a boundary line between the edge display region 102 and the non-display region 101 corresponding to the edge region.

In some embodiments, referring to FIG. 13, a distance from an edge of the first optical processing layer 4 to the edge display region 102 is 1.15 mm; a tolerance for the assembly and manufacturing of the first optical processing layer 4 is 0.27 mm; an actual width of coverage of the first part 51 to the non-display region 101 of the first optical processing layer 4 is 1.15 mm-0.27 mm=0.88 mm; K=7.23 mm; and a light emitting angle of the light emitting surface of the outermost lamp bead 22 is in a range of −80 degrees to 80 degrees.

Figure 14:
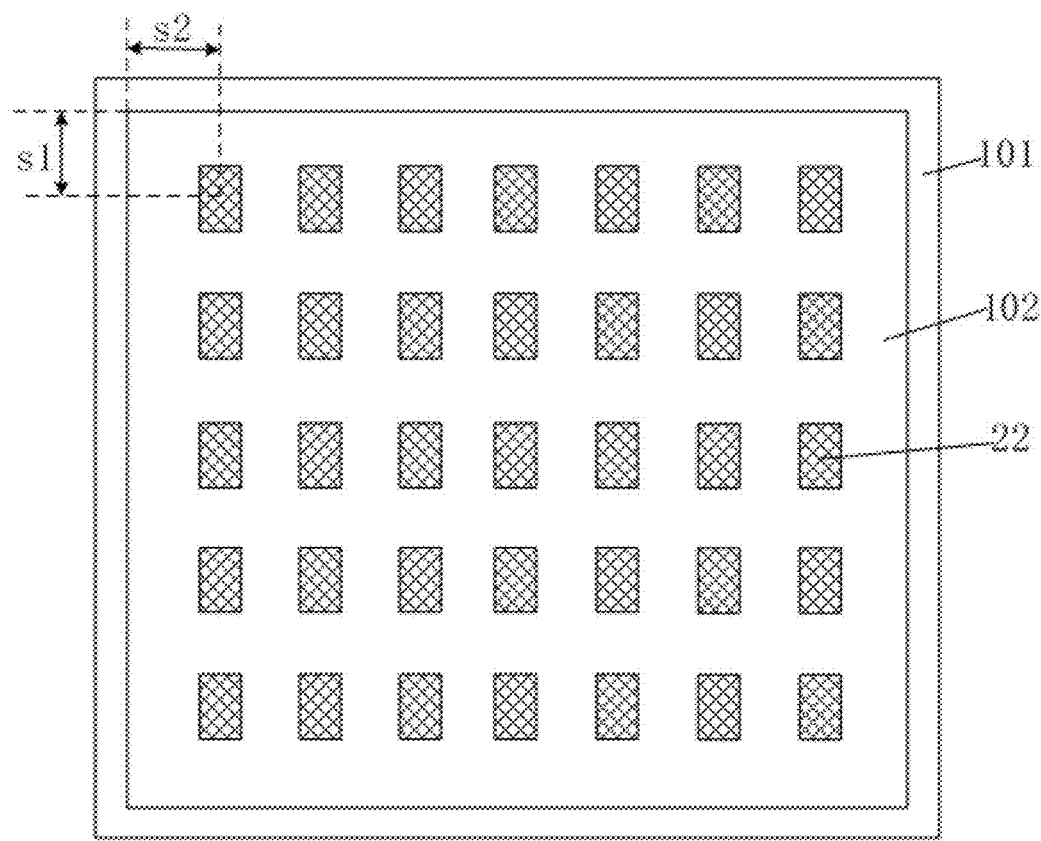
FIG. 14 is a schematic diagram illustrating a distribution of an array of lamp beads in a backlight module.

FIG. 14 is a schematic diagram illustrating a distribution of an array of lamp beads in a backlight module. In some embodiments, referring to FIG. 14, a distance s1 from a lamp bead 22 in an edge row of the array of lamp beads 22 to a boundary line of the edge display region 102 closest to the lamp bead 22 in the edge row is in a range of 1 mm to 3 mm; and a distance s2 from a lamp bead 22 in an edge column of the array of lamp beads 22 to a boundary line of the edge display region 102 closest to the lamp bead 22 in the edge column is in a range of 1 mm to 3 mm. Therefore, it is realized that lamp beads 22 in the head and tail rows and head and tail columns of the array of lamp beads 22 are arranged away from boundary lines of the edge display regions 102 where lamp beads 22 are located, respectively, so that blue light leakage at the peripheral edge of the backlight module can be weakened.

The distance s1 and the distance s2 are all from a center of the light emitting surface of the lamp bead 22.

In some embodiments, the distance s1 from the lamp bead 22 in the edge row of the array of lamp beads 22 to the boundary line of the edge display region 102 closest to the lamp bead 22 in the edge row is in a range of 1.5 mm to 2 mm; and the distance s2 from the lamp bead 22 in the edge column of the array of lamp beads 22 to the boundary line of the edge display region 102 closest to the lamp bead 22 in the edge column is in a range of 1.5 mm to 2 mm. The distance s1 and the distance s2 are within such a range, so that the effect of preventing blue light leakage is better. If the distance s1 and the distance s2 are too large, the peripheral edge of the backlight module will be darkened; and if the distances s1 and s2 are too small, blueing will be severe in the peripheral edge of the backlight module.

In some embodiments, referring to FIG. 13, the distance s1 from the lamp bead 22 in the edge row of the array of lamp beads 22 to the boundary line of the edge display region 102 closest to the lamp beads 22 in the edge row is 1.5 mm; and the distance s2 from the lamp bead 22 in the edge column of the array of lamp beads 22 to the boundary line of the edge display region 102 closest to the lamp beads 22 in the edge column is 1.5 mm.

In some embodiments, the mold frame 6 employs a mixture of Polycarbonate (PC) and yellow phosphor with a wavelength in a range of 560 nm to 580 nm. The yellow phosphor material with the wavelength in a range of 560 nm to 580 nm emits yellow light. With the mold frame 6 made of the mixture, the mixed light of the blue light and the yellow light incident into the mold frame 6 can be neutralized into white light, so that the blue light which is reflected from the peripheral mold frame 6 to the first optical processing layer 4 can be weakened, and the blue light leakage at the peripheral edge of the backlight module can be reduced.

In some embodiments, a yellow phosphor with a wavelength of 570 nm is employed, and is mixed with a white PC material to manufacture the yellow mold frame 6. A yellow color number of the yellow mold frame 6 may be PANTONE 109U, and is controlled by comparing with PANTONE standard color cards. The yellow mold frame 6 with the color number of PANTONE 109U can better weaken the blue light leakage at the peripheral edge of the backlight module.

Figure 15:
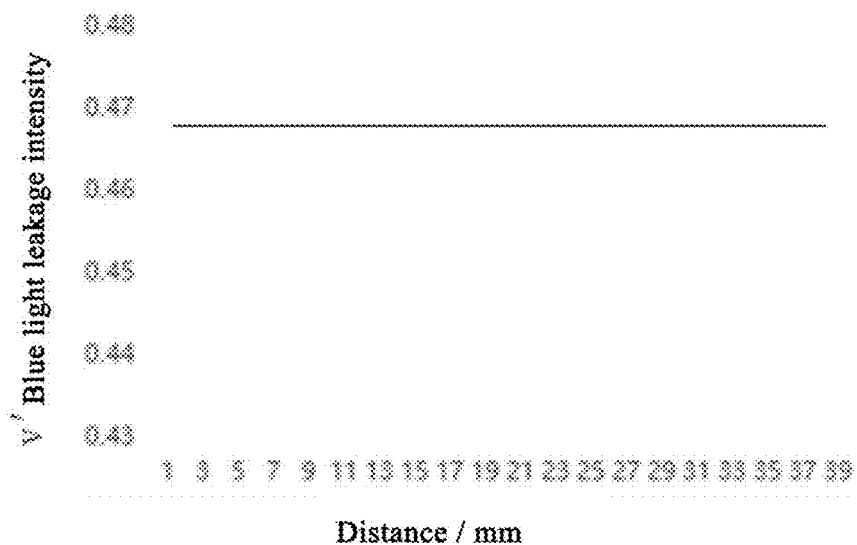
FIG. 15 is a curve illustrating variation of blue light leakage intensity of a backlight module after comprehensively improved through three schemes at a peripheral edge region, along any one of the paths of sampling points in FIG. 5.

FIG. 15 is a curve illustrating variation of blue light leakage intensity of a backlight module after comprehensively improved through three schemes at a peripheral edge region, along any one of the paths of sampling points in FIG. 5. In the embodiment of the present disclosure, referring to FIG. 15, through employing the scheme where the distribution densities of the second color conversion layer 5 and the distributions widths of respective regions with different distribution densities are designed to vary with blue light leakage intensity at the peripheral edge, the scheme where the lamp beads 22 in the head and tail rows and head and tail columns of the array of lamp beads 22 are arranged away from boundary lines of the edge display regions 102 where lamp beads 22 are located, respectively, and the scheme of the yellow mold frame, which are describe above, the blue light leaked from the peripheral edge of backlight module can be neutralized into white light, so that the blue light leakage at the peripheral edge of the backlight module can be reduced or eliminated.

Figure 16A:
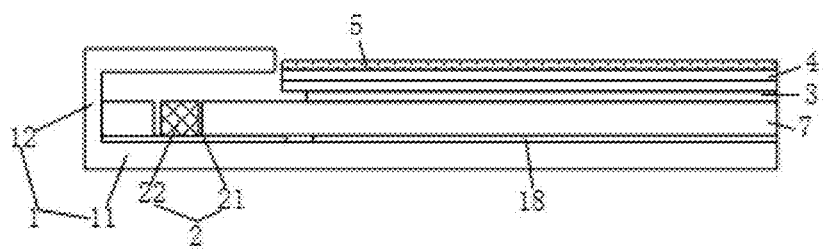
FIG. 16a is a cross-sectional view illustrating a structure of a part of a backlight module with an edge-lit backlight source at an edge, where a colored light source plate exists, in an embodiment of the present disclosure.
Figure 16B:
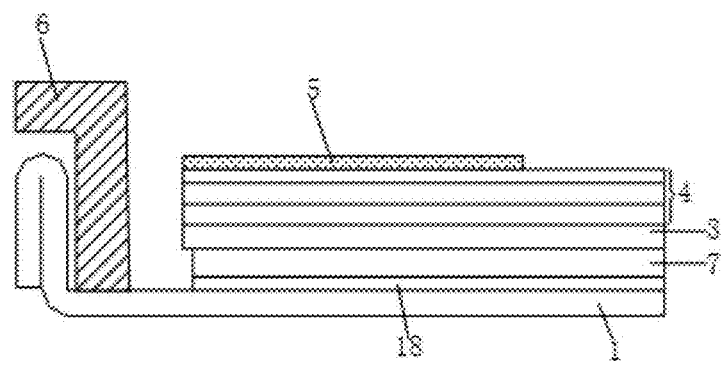
FIG. 16b is a cross-sectional view illustrating a structure of a part of a backlight module with an edge-lit backlight source at an edge, where a mold frame exists, in an embodiment of the present disclosure.

FIG. 16a is a cross-sectional view illustrating a structure of a part of a backlight module with an edge-lit backlight source at an edge, where a colored light source plate exists, in an embodiment of the present disclosure; and FIG. 16b is a cross-sectional view illustrating a structure of a part of a backlight module with an edge-lit backlight source at an edge, where a mold frame exists, in an embodiment of the present disclosure. In some embodiments, referring to FIGS. 16a and 16b, the back plate 1 includes a bottom wall 11 and a side wall 12, where the side wall 12 surrounds the peripheral edge of the bottom wall 11. The colored light source plate 2 is located on the side wall 12 at an edge of the bottom wall 11. The second optical processing layer 7 is arranged between the first color conversion layer 3 and the bottom wall 11 of the back plate 1, and the light emitting surface of the colored light source plate 2 faces an end face of an edge of the second optical processing layer 7. The backlight module further includes a mold frame 6 which is located on the bottom wall 11 of the back plate 1 and is arranged to surround edges of the bottom wall 11 other than the edge where the colored light source plate 2 is located. The mold frame 6 and the bottom wall 11 form an accommodating space, and the second optical processing layer 7, the first color conversion layer 3, the plurality of first optical processing layers 4 and the second color conversion layer 5 are accommodated in the accommodating space. The mold frame 6 is opposite to and spaced apart from the end faces of the edges of the second optical processing layer 7, the first color conversion layer 3, the plurality of first optical processing layers 4, and the second color conversion layer 5. With this arrangement, a space can be reserved for assembly and expansion of the peripheral edges of the second optical processing layer 7, the first color conversion layer 3, the plurality of first optical processing layers 4, and the second color conversion layer 5.

In some embodiments, referring to FIGS. 16a and 16b, the backlight module further includes a reflective layer 18 located between the bottom wall 11 of the back plate 1 and the colored light source plate 2, for reflecting the light irradiating thereon from the colored light source plate 2, to the light emitting side of the backlight module.

In some embodiments, referring to FIGS. 16a and 16b, the second optical processing layer 7 employs a light guide plate. The light guide plate can uniformly scatter light irradiating therein from the colored light source plate 2, so that it is beneficial for the uniform light to be converted into uniform white light after passing through the first color conversion layer 3, and it is beneficial to provide uniform backlight for the display panel.

In this embodiment, the colored light source plate 2 includes a substrate 21 and a plurality of lamp beads 22, where the lamp beads 22 are arranged on the substrate 21, and the substrate 21 is attached to the bottom wall 11 of the back plate 1. The light emitting surface of the lamp beads 22 faces the end face of the edge the light guide plate. That is, the colored light source plate 2 is an edge-lit light source. In a case where the backlight module employs an edge-lit backlight source, the scheme where the distribution densities of the second color conversion layer 5 and the distributions widths of respective regions with different distribution densities are designed to vary with blue light leakage intensity at the peripheral edge, and the scheme of the yellow mold frame, which are describe above, can also neutralize the blue light leaked from the peripheral edge of backlight module into white light, so that the blue light leakage at the peripheral edge of the backlight module can be reduced or eliminated.

In the embodiment of the present disclosure, through employing the scheme where the distribution densities of the second color conversion layer and the distributions widths of respective regions with different distribution densities are designed to vary with blue light leakage intensity at the peripheral edge, the scheme where the lamp beads in the head and tail rows and head and tail columns of the array of lamp beads are arranged away from boundary lines of the edge display regions where lamp beads are located, respectively, and the scheme of the yellow mold frame, the blue light leaked from the peripheral edge of backlight module can be neutralized into white light, so that the blue light leakage at the peripheral edge of the backlight module can be reduced or eliminated.

Based on the above structure of the backlight module, an embodiment of the present disclosure further provides a method of manufacturing the backlight module, where the method includes steps S101 and S102. In step S101, a second color conversion layer is formed on a surface, away from the back plate, of at least one first optical processing layer in a plurality of first optical processing layers farthest to the back plate, through spraying and printing with a mesh mask.

In this step, the mesh mask employs a steel mesh, and a shape of meshes in the steel mesh is circular. Sub-patterns of the second color conversion layer are formed in the region corresponding to the meshes, through spraying and printing. Interval regions between the sub-patterns are formed corresponding to interval regions between meshes of the steel mesh. Distribution density of the meshes in the steel mesh is consistent with the distribution density of the second color conversion layer on the first optical processing layer, and distribution widths of the meshes with different distribution densities in the steel mesh are consistent with the distribution widths of the second color conversion layer in regions with different distribution densities on the first optical processing layer.

In step S102, a colored light source plate, a first color conversion layer and a plurality of first optical processing layers are sequentially arranged on a back plate.

The second color conversion layer is located on a side of the first optical processing layer away from the back plate. An orthographic projection of the second color conversion layer on the first optical processing layer is distributed in the peripheral edge region of the first optical processing layer.

Figure 17:
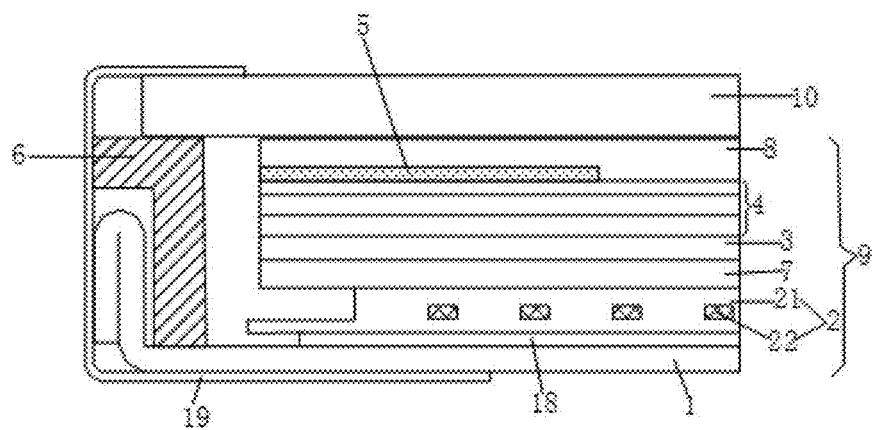
FIG. 17 is a cross-sectional view illustrating a structure of an edge of a display module in an embodiment of the present disclosure.

In a second aspect, an embodiment of the present disclosure provides a display module. FIG. 17 is a cross-sectional view illustrating a structure of an edge of a display module in an embodiment of the present disclosure. Referring to FIG. 17, the display module includes the backlight module 9 in any one of the embodiments described above and a display panel 10 located on the light emitting side of the backlight module 9.

In some embodiments, the display module further includes an edge tape 19, which wraps end faces of the peripheral edge of the backlight module 9 and the display panel 10, which are stacked together.

By employing the backlight module in any one of the embodiments described above, the blue light leakage phenomenon at the peripheral edge of the backlight module can be weakened or eliminated, so that the quality of display image of the display module can be improved.

The display module may be any product or component with a display function, such as an LCD panel, an LCD television, a mobile phone, a tablet computer, a notebook computer, a monitor, a laptop, a digital photo frame, a navigator, or the like.

It will be understood that the above embodiments are merely exemplary embodiments adopted to illustrate the principles of the present disclosure, and the present disclosure is not limited thereto. It will be apparent to one of ordinary skill in the art that various modifications and improvements can be made without away from the spirit and essence of the present disclosure, and such modifications and improvements are also considered to be within the scope of the present disclosure.

What is claimed is:

1. A backlight module, comprising a back plate, a colored light source plate, a first color conversion layer and a plurality of first optical processing layers,
wherein the colored light source plate, the first color conversion layer and the plurality of first optical processing layers are on the back plate and sequentially arranged away from the back plate;
the colored light source plate is configured to emit non-white monochromatic light;
the first color conversion layer is configured to convert the monochromatic light emitted by the colored light source plate and incident into the first color conversion layer, into white light;
the plurality of first optical processing layers are each configured to scatter light incident into the first optical processing layer;
the backlight module further comprises a second color conversion layer on at least a side, away from the back plate, of one of the plurality of first optical processing layers farthest from the back plate;
an orthographic projection of the second color conversion layer on the first optical processing layer is in a peripheral edge region of the first optical processing layer; and
the second color conversion layer is configured to convert the monochromatic light emitted by the colored light source plate and incident into the second color conversion layer, into white light,
wherein the first optical processing layer further comprises a middle display region;
a distribution density of the second color conversion layer is gradually reduced along any direction from the peripheral edge region to the middle display region of the first optical processing layer;
the peripheral edge region of the first optical processing layer comprises a non-corner region and at least one corner region;
the non-corner region comprises a non-display region and an edge display region; each of the at least one corner region comprises a non-display region and an edge display region; the non-display regions of the non-corner region and the corner region are connected to each other; and the edge display regions of the non-corner region and the corner region are connected to each other; and
the non-display regions surround the edge display region; and the edge display regions surround the middle display region,
wherein the distribution density of the second color conversion layer per area of square millimeter varies linearly from 100% to 3%, in any direction from the peripheral edge region to the middle display region of the first optical processing layer.

2. A backlight module, comprising a back plate, a colored light source plate, a first color conversion layer and a plurality of first optical processing layers,
wherein the colored light source plate, the first color conversion layer and the plurality of first optical processing layers are on the back plate and sequentially arranged away from the back plate;
the colored light source plate is configured to emit non-white monochromatic light;
the first color conversion layer is configured to convert the monochromatic light emitted by the colored light source plate and incident into the first color conversion layer, into white light;
the plurality of first optical processing layers are each configured to scatter light incident into the first optical processing layer;
the backlight module further comprises a second color conversion layer on at least a side, away from the back plate, of one of the plurality of first optical processing layers farthest from the back plate;
an orthographic projection of the second color conversion layer on the first optical processing layer is in a peripheral edge region of the first optical processing layer; and
the second color conversion layer is configured to convert the monochromatic light emitted by the colored light source plate and incident into the second color conversion layer, into white light,
wherein the first optical processing layer further comprises a middle display region;
a distribution density of the second color conversion layer is gradually reduced along any direction from the peripheral edge region to the middle display region of the first optical processing layer;
the peripheral edge region of the first optical processing layer comprises a non-corner region and at least one corner region;
the non-corner region comprises a non-display region and an edge display region; each of the at least one corner region comprises a non-display region and an edge display region; the non-display regions of the non-corner region and the corner region are connected to each other; and the edge display regions of the non-corner region and the corner region are connected to each other; and
the non-display regions surround the edge display region; and the edge display regions surround the middle display region,
wherein the distribution density of the second color conversion layer per area of square millimeter varies, in a direction from any one of the at least one corner region to the middle display region of the first optical processing layer, as follows: 100%→any distribution density in a range of 20% to 30%→any distribution density in a range of 10% to 15%→any distribution density in a range of 6% to 8%→any distribution density in a range of 1% to 3%.

3. The backlight module according to claim 2, wherein ranges of widths, in the direction from any one of the at least one corner region to the middle display region of the first optical processing layer, of respective regions with different distribution densities in the second color conversion layer are as follows:

a width of a region with the distribution density of 100% is in a range of 0.8 mm to 1.0 mm;
a width of a region with any distribution density in the range of 20% to 30% is in a range of 4.5 mm to 5.5 mm;
a width of a region with any distribution density in the range of 10% to 15% is in a range of 5.0 mm to 6.0 mm;
a width of a region with any distribution density in the range of 6% to 8% is in a range of 4.0 mm to 5.0 mm; and
a width of a region with any distribution density in the range of 1% to 3% is in a range of 4.0 mm to 5.0 mm.

4. The backlight module according to claim 2, wherein the distribution density of the second color conversion layer per area of square millimeter varies, in a direction from the non-corner region to the middle display region of the first optical processing layer, as follows: 100%→any distribution density in a range of 10% to 15%→any distribution density in a range of 6% to 8%→any distribution density in a range of 1% to 3%.

5. The backlight module according to claim 4, wherein ranges of widths, in the direction from the non-corner region to the middle display region of the first optical processing layer, of respective regions with different distribution densities in the second color conversion layer are as follows:

a width of a region with the distribution density of 100% is in a range of 0.8 mm to 1.0 mm;
a width of a region with any distribution density in the range of 10% to 15% is in a range of 5.0 mm to 6.0 mm;
a width of a region with any distribution density in the range of 6% to 8% is in a range of 4.0 mm to 5.0 mm; and
a width of a region with any distribution density in the range of 1% to 3% is in a range of 4.0 mm to 5.0 mm.

6. The backlight module according to claim 2, wherein the corner region of the first optical processing layer is a corner region with a right angle; and
a shape of a region, within the corner region of the first optical processing layer, with any distribution density per area of square millimeter in the range of 20% to 30% in the second color conversion layer, is an isosceles right triangle.

7. The backlight module according to claim 1, wherein an orthographic projection of a region of the second color conversion layer with the distribution density per area of square millimeter of 100% on the first optical processing layer, covers the non-display region.

8. A backlight module, comprising a back plate, a colored light source plate, a first color conversion layer and a plurality of first optical processing layers,
wherein the colored light source plate, the first color conversion layer and the plurality of first optical processing layers are on the back plate and sequentially arranged away from the back plate;
the colored light source plate is configured to emit non-white monochromatic light;
the first color conversion layer is configured to convert the monochromatic light emitted by the colored light source plate and incident into the first color conversion layer, into white light;
the plurality of first optical processing layers are each configured to scatter light incident into the first optical processing layer;
the backlight module further comprises a second color conversion layer on at least a side, away from the back plate, of one of the plurality of first optical processing layers farthest from the back plate;

an orthographic projection of the second color conversion layer on the first optical processing layer is in a peripheral edge region of the first optical processing layer; and the second color conversion layer is configured to convert the monochromatic light emitted by the colored light source plate and incident into the second color conversion layer, into white light, wherein the first optical processing layer further comprises a middle display region;

a distribution density of the second color conversion layer is gradually reduced along any direction from the peripheral edge region to the middle display region of the first optical processing layer;

the peripheral edge region of the first optical processing layer comprises a non-corner region and at least one corner region;

the non-corner region comprises a non-display region and an edge display region; each of the at least one corner region comprises a non-display region and an edge display region; the non-display regions of the non-corner region and the corner region are connected to each other; and the edge display regions of the non-corner region and the corner region are connected to each other; and the non-display regions surround the edge display region; and the edge display regions surround the middle display region, wherein the second color conversion layer comprises a first part and a second part, an orthographic projection of the first part on the first optical processing layer covers the non-display region;

an orthographic projection of the second part on the first optical processing layer is in the edge display region; and the second part comprises a plurality of sub-patterns arranged at intervals.

9. The backlight module according to claim 8, wherein a spacing between any two adjacent sub-patterns of the plurality of sub-patterns varies linearly from 0.25 mm to 0.7 mm, in any direction from the edge display region of the peripheral edge region to the middle display region of the first optical processing layer.

10. The backlight module according to claim 8, wherein a spacing between any two adjacent sub-patterns of the plurality of sub-patterns varies, in a direction from the edge display region within any one of the at least one corner region of the first optical processing layer to the middle display region, as follows: any spacing in a range of 0.20 mm to 0.28 mm→any spacing in a range of 0.30 mm to 0.38 mm→any spacing in a range of 0.5 mm to 0.7 mm→any spacing in a range of 0.8 mm to 0.9 mm.

11. The backlight module according to claim 8, wherein a spacing between any two adjacent sub-patterns of the plurality of sub-patterns varies, in a direction from the edge display region within the non-corner region of the first optical processing layer to the middle display region, as follows: any spacing in a range of 0.30 mm to 0.38 mm→any spacing in a range of 0.5 mm to 0.7 mm→any spacing in a range of 0.8 mm to 0.9 mm.

12. The backlight module according to claim 1, wherein orthographic projections of the colored light source plate, the first color conversion layer, the plurality of first optical processing layers and the second color conversion layer on the back plate overlap each other; and the colored light source plate comprises an array of lamp beads; and a light emitting surface of each of the lamp beads is opposite to the first color conversion layer.

13. The backlight module according to claim 12, wherein in any edge region of the first optical processing layer, a distribution width, in the edge display region, of an orthographic projection of the second color conversion layer on the first optical processing layer is K; and K is a shortest distance from an intersection between a boundary light ray closest to the middle display region among light rays emitted by the lamp bead at the outermost side of the edge region and the first optical processing layer, to a boundary line between the edge display region and the non-display region, which is corresponding to the edge region.

14. The backlight module according to claim 12, wherein a distance from the lamp bead in an edge row of the array of lamp beads to a boundary line of the edge display region closest to the lamp bead in the edge row is in a range of 1 mm to 3 mm; and a distance from the lamp bead in an edge column of the array of lamp beads to a boundary line of the edge display region closest to the lamp bead in the edge column is in a range of 1 mm to 3 mm.

15. The backlight module according to claim 1, wherein the colored light source plate is configured to emit blue light with a wavelength of 450 nm to 460 nm; and the second color conversion layer comprises yellow phosphor material with a wavelength in a range of 560 nm to 580 nm, wherein the backlight module further comprises a mold frame, and the mold frame comprises a mixture of polycarbonate and yellow phosphor with a wavelength in a range of 560 nm to 580 nm.

16. A display module, comprising the backlight module according to claim 1; and a display panel on a light emitting side of the backlight module.

17. The backlight module according to claim 2, wherein the colored light source plate is configured to emit blue light with a wavelength of 450 nm to 460 nm; and the second color conversion layer comprises yellow phosphor material with a wavelength in a range of 560 nm to 580 nm, wherein the backlight module further comprises a mold frame, and the mold frame comprises a mixture of polycarbonate and yellow phosphor with a wavelength in a range of 560 nm to 580 nm.

18. The backlight module according to claim 8, wherein the colored light source plate is configured to emit blue light with a wavelength of 450 nm to 460 nm; and the second color conversion layer comprises yellow phosphor material with a wavelength in a range of 560 nm to 580 nm, wherein the backlight module further comprises a mold frame, and the mold frame comprises a mixture of polycarbonate and yellow phosphor with a wavelength in a range of 560 nm to 580 nm.

19. A display module, comprising the backlight module according to claim 2; and a display panel on a light emitting side of the backlight module.

20. A display module, comprising the backlight module according to claim 8; and a display panel on a light emitting side of the backlight module.

* * * * *